(12) United States Patent
Federighi

(10) Patent No.: US 8,799,103 B1
(45) Date of Patent: Aug. 5, 2014

(54) CLIENT-SIDE STRUCTURED DATA CAPTURE AND REMOTE APPLICATION INTEGRATION USING A WEB BROWSER

(75) Inventor: Craig Michael Federighi, Los Altos Hills, CA (US)

(73) Assignee: Ariba, Inc., Sunnyvale, CA (US)

(*) Notice: Subject to any disclaimer, the term of this patent is extended or adjusted under 35 U.S.C. 154(b) by 669 days.

(21) Appl. No.: 12/284,170

(22) Filed: Sep. 17, 2008

Related U.S. Application Data

(60) Provisional application No. 60/994,856, filed on Sep. 20, 2007.

(51) Int. Cl.
*G06Q 30/00* (2012.01)

(52) U.S. Cl.
USPC ........................ 705/26.25; 709/217

(58) Field of Classification Search
USPC ............ 705/8, 10, 26, 7.14, 7.13, 7.17, 7.23, 705/26.25; 709/217
See application file for complete search history.

(56) References Cited

U.S. PATENT DOCUMENTS

| | | | |
|---|---|---|---|
| 6,134,532 A * | 10/2000 | Lazarus et al. ............. | 705/14.25 |
| 6,314,451 B1 * | 11/2001 | Landsman et al. ........... | 709/203 |
| 6,466,967 B2 * | 10/2002 | Landsman et al. ........... | 709/203 |
| 6,567,783 B1 | 5/2003 | Notani et al. | |
| 6,615,212 B1 | 9/2003 | Dutta et al. | |
| 6,697,824 B1 | 2/2004 | Bowman-Amuah | |
| 6,876,977 B1 | 4/2005 | Marks | |
| 6,965,868 B1 | 11/2005 | Bednarek | |
| 7,013,289 B2 | 3/2006 | Horn et al. | |
| 7,085,736 B2 | 8/2006 | Keezer et al. | |
| 7,133,868 B1 | 11/2006 | Ruest et al. | |
| 7,234,107 B1 | 6/2007 | Aoki et al. | |
| 7,260,783 B1 * | 8/2007 | Mika ............................ | 715/748 |
| 7,512,583 B2 | 3/2009 | Benson et al. | |
| 7,594,601 B2 | 9/2009 | Birjandi et al. | |
| 7,607,095 B2 | 10/2009 | Marcos et al. | |
| 7,620,653 B1 | 11/2009 | Swartz | |
| 7,660,738 B1 | 2/2010 | Siegel et al. | |
| 7,689,536 B1 * | 3/2010 | Weissman et al. ..... | 707/999.002 |
| 7,747,471 B1 | 6/2010 | Brown et al. | |
| 8,069,096 B1 | 11/2011 | Ballaro et al. | |
| 8,271,477 B2 | 9/2012 | Sood et al. | |
| 2002/0052948 A1 | 5/2002 | Baudu et al. | |
| 2002/0143817 A1 | 10/2002 | Dutta et al. | |
| 2002/0165799 A1 | 11/2002 | Jaffe et al. | |

(Continued)

OTHER PUBLICATIONS

Ariba PunchOut Implementation Guide, Dec. 2000, pp. 8-21.*

(Continued)

*Primary Examiner* — Ramsey Refai
(74) *Attorney, Agent, or Firm* — Van Pelt, Yi & James LLP

(57) ABSTRACT

Generating a structured data object is disclosed. A plurality of pieces of content from a website is extracted at an Internet browser application associated with a client side. A structured data object is assembled, at the Internet browser application associated with the client side, using the plurality of pieces of content extracted from the website. Extracting and assembling includes performing one or more scripts, wherein at least some of the one or more scripts is/are provided to the Internet browser application associated with the client side by an entity that is not associated with the website.

11 Claims, 8 Drawing Sheets

(56) References Cited

U.S. PATENT DOCUMENTS

| | | |
|---|---|---|
| 2002/0198800 A1 | 12/2002 | Shamrakov |
| 2003/0023513 A1 | 1/2003 | Festa et al. |
| 2003/0037069 A1 | 2/2003 | Davison |
| 2003/0050914 A1 | 3/2003 | Bachman et al. |
| 2003/0182625 A1 | 9/2003 | Davidov et al. |
| 2003/0204490 A1 | 10/2003 | Kasriel |
| 2003/0212583 A1 | 11/2003 | Perras et al. |
| 2004/0075686 A1 | 4/2004 | Watler et al. |
| 2004/0107125 A1 | 6/2004 | Guheen et al. |
| 2004/0172595 A1 | 9/2004 | Lerner et al. |
| 2005/0010867 A1 | 1/2005 | Igata et al. |
| 2005/0028087 A1 | 2/2005 | Barrie et al. |
| 2005/0198202 A1 | 9/2005 | Yamamoto |
| 2005/0273396 A1 | 12/2005 | Aliabadi et al. |
| 2006/0010378 A1 | 1/2006 | Mori |
| 2007/0033532 A1 | 2/2007 | Lemelson |
| 2007/0061266 A1 | 3/2007 | Moore et al. |
| 2007/0118794 A1 | 5/2007 | Hollander et al. |
| 2007/0198924 A1 | 8/2007 | Koike et al. |
| 2008/0015958 A1 | 1/2008 | Vanker et al. |
| 2008/0140688 A1 | 6/2008 | Clayton et al. |
| 2008/0162480 A1 | 7/2008 | Clayton et al. |
| 2008/0243638 A1 | 10/2008 | Chan et al. |
| 2012/0110068 A1 | 5/2012 | Emmelmann |
| 2012/0303676 A1 | 11/2012 | Tuzhilin et al. |

OTHER PUBLICATIONS

"Earn money from relevant ads on your website: Products", Google AdSense, https://www.google.com/adsense/login/en_US/; Sep. 15, 2008.

"Earn money from relevant ads on your website: Putting ads on your site", Google AdSense, https://www.google.com/adsense/login/en_US/; Sep. 15, 2008.

"Earn money from relevant ads on your website: Where do the ads come from?", Google AdSense, https://www.google.com/adsense/login/en_US/; Sep. 15, 2008.

"Earn money from relevant ads on your website: Show only appropriate ads", Google AdSense, https://www.google.com/adsense/login/en_US/; Sep. 15, 2008.

"Earn money from relevant ads on your website: Getting paid", Google AdSense, https://www.google.com/adsense/login/en_US/; Sep. 15, 2008.

"Earn money from relevant ads on your website: How do I get started?", Google AdSense, https://www.google.com/adsense/login/en_US/; Sep. 15, 2008.

"Earn money from relevant ads on your website: What our publishers say", Google AdSense, https://www.google.com/adsense/login/en_US/; Sep. 15, 2008.

Hall et al., "JavaScript: Adding Dynamic Content to Web Pages", Slide presentation, 2001-2003 [available online] http://www.corewebprogramming.com [retrieved] Jun. 12, 2013.

* cited by examiner

```
<script type="text/javascript"><!-
bootstrap = {
        ASNID : "ANID50",
        ID_PartNo : "PartNoSpan",
        ID_Desc : "descriptionDiv",
        ID_Price : "PriceSpan",
        ID_OrderControl : "SpanAroundAddToCartButton",
}--></script>
<script type="text/javascript" src="http://supplier.ariba.com/punchout.js">
```

FIG. 4

CLIENT-SIDE STRUCTURED DATA CAPTURE AND REMOTE APPLICATION INTEGRATION USING A WEB BROWSER

CROSS REFERENCE TO OTHER APPLICATIONS

This application claims priority to U.S. Provisional Patent Application No. 60/994,856 entitled GENERATION OF A STRUCTURED DATA OBJECT ON A CLIENT SIDE USING A BROWSER APPLICATION filed Sep. 20, 2007 which is incorporated herein by reference for all purposes.

BACKGROUND OF THE INVENTION

Business to business applications over the Internet have become increasingly popular. One type of business to business application in particular is a supplier network in which members of the supplier network buy and sell goods and services. For example, members of the supplier network may be screened and/or agree to a service contract with a supplier network provider (e.g., Ariba) that provides them with systems and/or applications to generate and/or manage purchases.

Punchout is a convenient feature associated with some supplier networks that permits up to date information from a seller to be presented to a buyer and (if desired) imported into an e-procurement system. For example, a supplier website typically has the most up to date prices and/or products offered and this up to date information is presented to the buyer to make a decision and (if desired) a structured data object representing the desired product is communicated to the buyer's e-procurement system (e.g., for approval). Traditionally, a website designer has to implement punchout protocol code on a supplier's website; these modifications are not trivial. It would be desirable to develop new techniques that make it easier for smaller suppliers or other website owners to implement punchout.

BRIEF DESCRIPTION OF THE DRAWINGS

Various embodiments of the invention are disclosed in the following detailed description and the accompanying drawings.

FIG. 4 is a diagram illustrating an embodiment of a bootstrap script.

DETAILED DESCRIPTION

Figure 1:
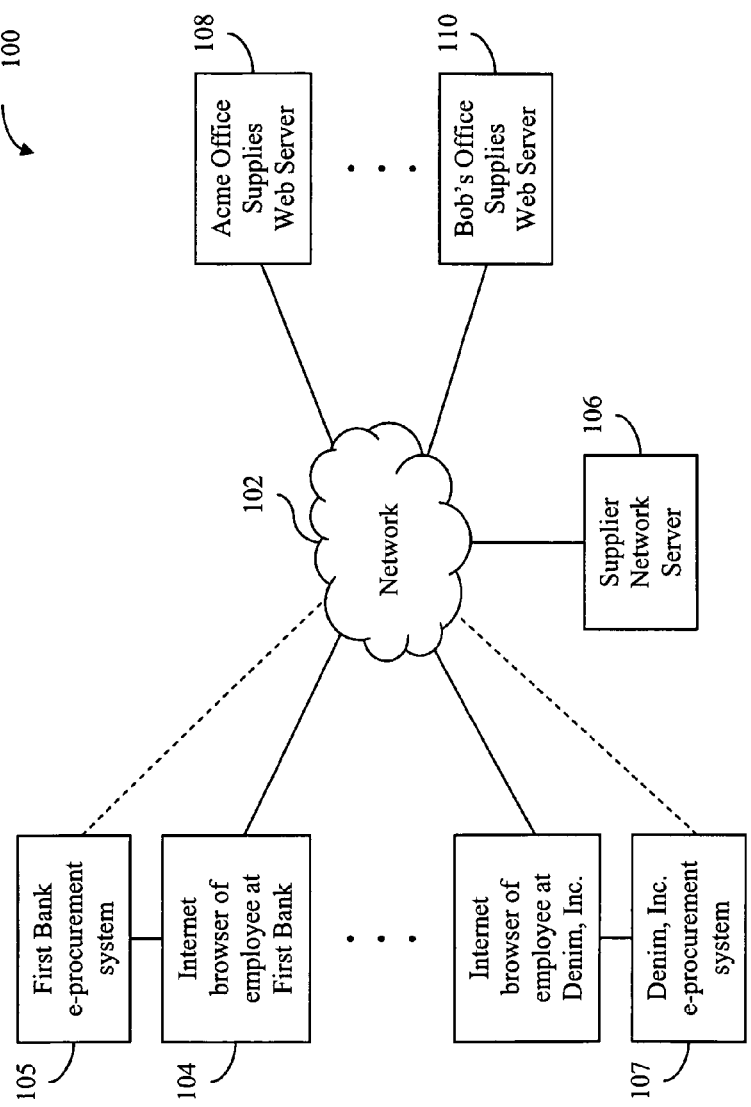
FIG. 1 is a diagram illustrating an embodiment of a system associated with a supplier network and e-procurement.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for generating a structured data object is disclosed herein. The structured data object is generated client-side (within Internet browser application used by the end user to view the site) by executing script code imported from an outside source. Using markup the identifiers (or other means of content identification), content is extracted or scraped from the webpage and a structured data object is generated. Traditionally, a structured data object is generated on the server side, for example by custom application code running on a web server. In some embodiments, a structured data object is generated at an Internet browser application using one or more scripts. For example, in some configurations an owner or other entity responsible for a website adds HTML to the template for web pages containing product information to reference a bootstrap script from the supplier network in which they participate, and further declares additional tags or identifiers, the exact names or values of which are website specific. Using the provided names or values, that script or another script, when running in an end user's browser, is able to extract the proper content to assemble a structured data object. In some embodiments, a structured data object represents or is associated with a product sought to be bought and/or the structured data object is exported to an e-procurement system. In some embodiments, a structured data object is exported to some other application or system, such as an address book, an email application, a digital photo album, etc.

FIG. 1 is a diagram illustrating an embodiment of a system associated with a supplier network and e-procurement. In the example shown, devices in system 100 communicate with each other via network 102. In various embodiments, network 102 includes a variety of wired/wireless networks and/or uses a variety of protocols, such as Internet protocols. System 100 in this particular example is a business to business system where a group of buyers have access to a group of suppliers (i.e., sellers). These buyers and suppliers are members of a supplier network. In various embodiments, members of a supplier network have been pre-screened, signed a service contract with a supplier network provider (e.g., Ariba), agreed to the terms of the supplier network, and/or paid a service fee to a supplier network provider.

In this example, an employee of First Bank establishes a session, communicates with, or otherwise accesses supplier network server 106 using an Internet browser application 104. For example, the employee goes to a Uniform Resource Locator (URL) associated with supplier network server 106 and performs identification and/or verification as required by the particular supplier network server. In other embodiments, the user may authenticate to the Supplier Network (directly, or through their procurement application), but access to the supplier website (and any list of such sites) would not generally be performed through the Supplier Network. Instead, once authenticated (i.e. tagged with a cookie), the user can find and browse to supplier websites through any means—e.g. via a search on Google, typing in www.somesupplier.com, or searching within the catalog of their eProcurment system— and once there the supplier website pages will pull the JavaScript from the supplier network which will check the cookie and set up the punchout appropriately.

Suppliers associated with the supplier network and/or their products are displayed to the employee of First Bank via Internet browser application 104. For example, products of Bob's Office supplies and Acme Office Supplies are displayed to the employee. After viewing available products, the employee of First Bank selects the products he wants to buy and imports related information (e.g., product name, part number, supplier ID, quantity, price, etc.) into the First Bank e-procurement system 105.

In various embodiments, an e-procurement system is associated with accounts payable, includes a master vendor list, and/or has controls for business flows, such as the approval of a purchase or authorization of payment once a product is received. SAP and PeopleSoft are some example companies that produce e-procurement systems. In some embodiments, a buyer selects products from two or more suppliers, but the products from the different suppliers do not necessarily need to be approved separately in a buyer's e-procurement system.

Punchout is a feature or capability associated with accessing and displaying information that is managed and updated by a particular supplier and (when appropriate) importing some or all of this information into a buyer's e.g., e-procurement system. In some embodiments, content from a supplier's website is accessed, is displayed to a user (e.g., during a supplier network session), and/or is imported into a buyer's e-procurement system. For example, in system 100, Acme Office Supplies web server 108 is accessed and content from web server 108 is displayed to the employee of First Bank via Internet browser 104. The employee can view the same prices and products that are listed on the supplier website, thus permitting the employee to make purchasing decisions with the most up to date information. If the employee decides to buy an item, the product information (e.g., which originated from web server 108) is imported into e-procurement system 105.

Punchout offers a variety of advantages. For example, the latest prices offered by a particular supplier are able to be presented to a buyer so that a purchasing decision can be made with the most up to date information. Similarly, when a product is released or discontinued buyers are able to know about the change. Without punchout, it would be annoying to import a product into an e-procurement system, get the purchase approved, and then find out the product is discontinued or there is a newer version available. A supplier network provider (e.g., associated with supplier network server 106) may also benefit because that entity does not have to store and update a duplicate copy of a supplier's product list and/or prices. This may reduce the amount of work the supplier network provider is responsible for.

In some embodiments, information is imported into a buyer's e-procurement system as a structured data object during punchout. A structured data object as used herein is a data object where the fields or structure are defined, either explicitly or implicitly. In some embodiments, a structured data object used to import data during punchout is an Extensible Markup Language (XML) object. In some embodiments, a buyer's e-procurement system is able to import, store, and/or operate on a structured data object generated during punchout with little or no pre-processing or transformation. One example of a structured data object is:

TABLE 1

Example of a structured data object

| Supplier | Manufacturer | Part Number | Description | Quantity | Unit Price |
|---|---|---|---|---|---|
| Bob's Office Supplies | Value Brand | VB100 | Value Brand Black Toner Cartridge | 1 | $50.00 |
| Acme Office Supplies | WorkLife | WLE55R | WorkLife Red Ergonomic Stapler | 10 | $5.75 |

Alternatively, in some embodiments, a structured data object only includes the bottom two rows (i.e., values only). In such embodiments, the order or sequencing of the values may be predefined so that a recipient knows the first value is the supplier, the second value is the manufacturer, etc. In some embodiments, some other fields (e.g., SKU, preferred vendor, etc.) are defined or used in addition to or as an alternative to those shown in this example. In some embodiments, structured data objects are imported into systems or applications other than an e-procurement system; some embodiments are described in further detail below.

Although punchout offers a number of advantages, some companies may find it expensive or difficult to implement punchout. For example, while a larger supplier such as Acme Office Supplies may have the resources and/or technical experience to implement punchout capabilities, a smaller supplier such as Bob's Office Supplies may find it difficult and/or expensive to implement punchout. They may, for example, not have an employee capable of making the necessary changes to their website and/or may not want to pay a contractor to do it.

Figure 2A:
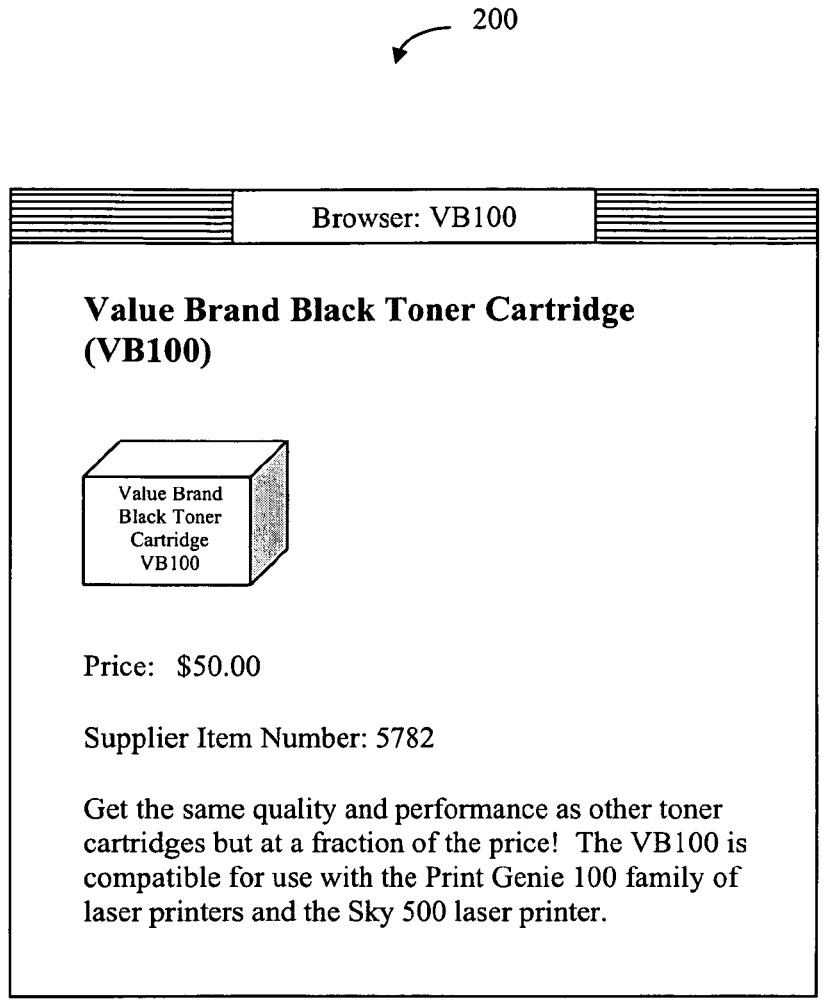
FIG. 2A illustrates an example of a supplier web page displayed to a regular user.

FIG. 2A illustrates an example of a supplier web page displayed to a regular user. In the example shown, a regular user is one who is not associated with a supplier network and/or e-procurement. For example, the user may be an employee at a company that is not part of a supplier network or may be a student who wants to buy some supplies for school. Web page 200 is also referred to as a regular web page (i.e., a regular or default version of a web page displayed to regular users).

In this example, web page 200 includes a product name (i.e., Value Brand Black Toner Cartridge), a part number (i.e., VB100), a picture of the product, a price, a supplier item number, and a description of the product.

Figure 2B:
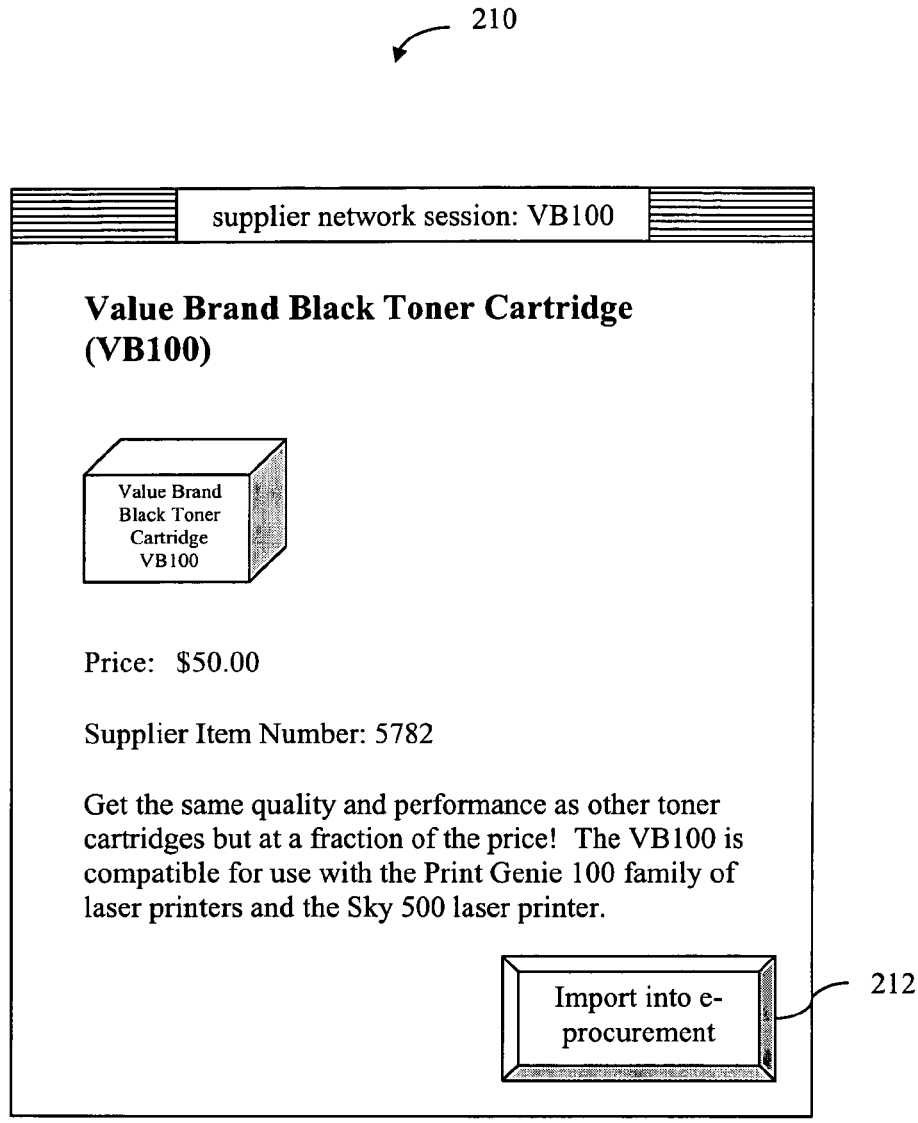
FIG. 2B illustrates an embodiment of a supplier web page modified using one or more scripts.

FIG. 2B illustrates an embodiment of a supplier web page modified using one or more scripts. In the example shown, web page 200 has been modified to produce web page 210 which includes a button to generate a structured data object and/or import a structured data object into an e-procurement system.

The header of web page 210 reads, "Supplier network session: VB100" which indicates that the Internet browser application is aware the user is associated with a supplier network. In some embodiments, the user first initiates a supplier network session using an Internet browser application (e.g., goes to www.ariba.com and performs authentication and/or login as appropriate) and then (e.g., from that session or window) accesses supplier web page 210. In some embodiments, some other sequence of events or states occurs to cause web page 210 to be displayed (e.g., instead of web page 200). In some embodiments, non-volatile memory or storage is used to record if a user has previously accessed a supplier network or had a supplier network session active. Some examples include using cookies in an Internet browser application, etc.

By pressing import button 212 (e.g., using a mouse or keyboard), a structured data object is exported (and, if needed, generated) to an e-procurement system where it is processed or otherwise handled as appropriate. For example, it may be added to a shopping cart or group of other products desired to be purchased. A supervisor or manager at the buying company accesses the e-procurement system to approve/deny the purchase. In various embodiments, the structured data object is generated prior to pressing import button 212 (e.g., so that it is ready to be sent) or is generated only when import button 212 is pressed.

In some embodiments, button 212 replaces an existing button, for example labeled "add to shopping cart." In web pages where there is an existing button, it may be undesirable to leave an existing button in. For example, the user may be confused by multiple buttons and/or accidentally add an item to a shopping cart for purchase via the supplier website rather than exporting the item to an e-procurement system. In some embodiments, a supplier provides a tag or identifier associated with an existing button so that the existing button can be replaced.

In some embodiments, a displayed web page varies based not only on whether a user is associated with a supplier network, but also depending upon the particular buying company. This is as a result of a client side implementation, as more fully described below. For example, an employee at First Bank sees one version and an employee at Denim, Inc. sees another version. This may be useful if a buying company has product filters in place (e.g., because they want their employees to buy certain brands and/or configurations) and/or if the buying company has a special arrangement. For example, certain buyers may be large enough to receive special discounts, configurations, and/or products from one or more suppliers. Alternatively, in some embodiments, all users associated with a supplier network see the same web page regardless of which buyer they are associated with. For example, employees at Denim, Inc. and First Bank in such embodiments would see the same version of a web page.

Figure 3:
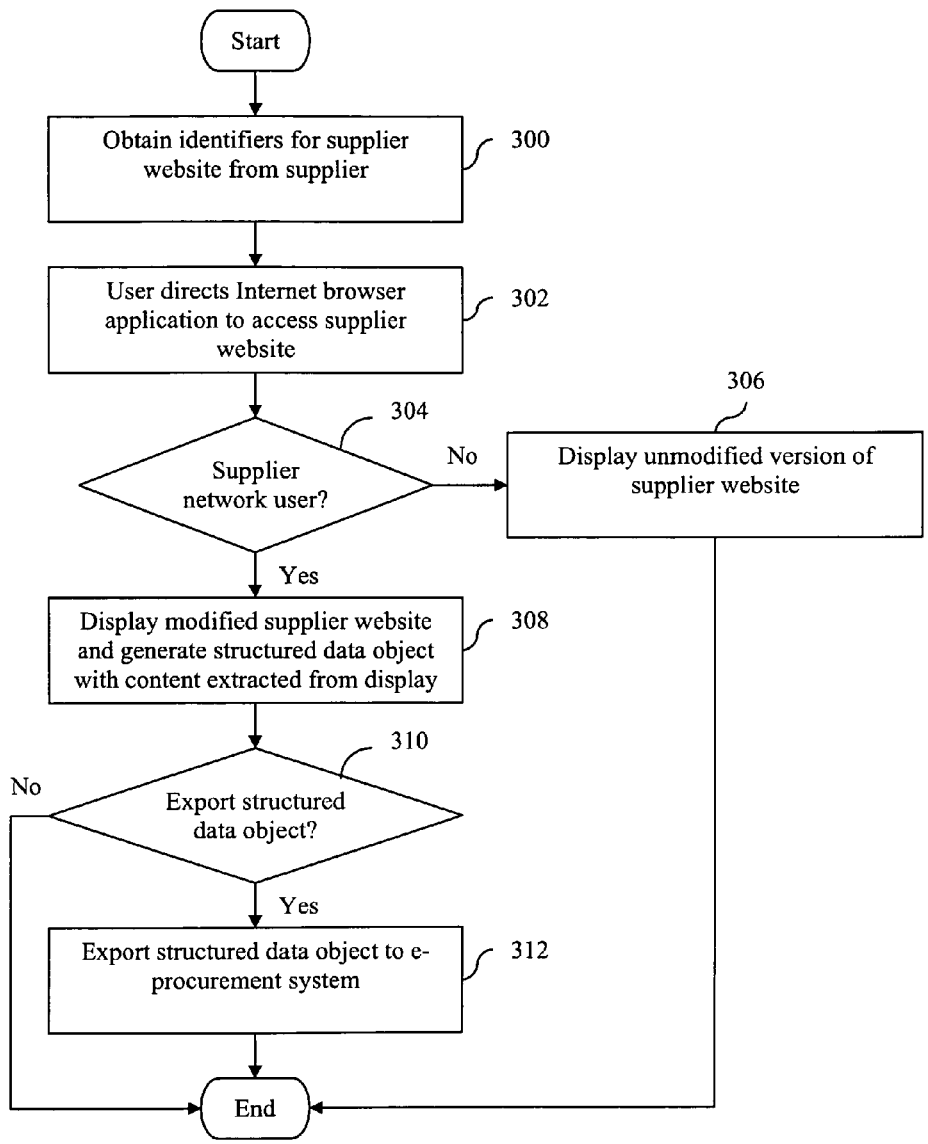
FIG. 3 is a flowchart illustrating an embodiment of a process for performing punchout.

FIG. 3 is a flowchart illustrating an embodiment of a process for performing punchout. In the example shown, the process may be used to display web pages 200 and/or 210. This process is one example embodiment of performing punchout, and other embodiments are more fully described below.

At 300, identifiers for a supplier website are obtained from a supplier. In some embodiments, an identifier is a tag assigned to content that is displayed on a website and these pieces of content are used to assemble a structured data object. In some embodiments, identifiers are obtained at 300 by providing a supplier with a script, list, or form to be completed by a supplier and the supplier fills in the identifiers. In some cases, if a piece of content is not already tagged or associated with an identifier this association or tagging is performed. In some embodiments, the supplier's web pages need not be modified to explicitly include the script; instead, a customized Internet browser (e.g. running a special plugin) could be running supplier-network aware script that monitors access to registered supplier websites and automatically performs script invocation.

A user directs an Internet browser application to access a supplier website at 302. It is determined at 304 if a user is a supplier network user. For example, the script include from the end user's browser to the supplier network triggers this check. In various embodiments, this is determined in a variety of ways. In some embodiments, this decision or determination is based on whether there is an active supplier network session, connection, or application running. In some embodiments, it is not required to have an active or current supplier network session running and if a user has at some time in the past accessed a supplier network or had a supplier network session, connection, or application running (and perhaps has been tagged by the supplier network with a browser cookie) then the user is determined to be a supplier network user.

If a user is not a supplier network user, at 306 an unmodified version of a supplier website is displayed. For example, website 200 of FIG. 2A is displayed. Otherwise, at 308 a modified supplier website is displayed and, should the user later activate the "Add to eProcurement" button, a structured data object is generated with content extracted from a display. In some embodiments, the web page displayed at 308 is the result of modifications made by script to the original document from 306. Modification is performed on a client side rather than modifying at a server side and sending the modified version to a client side. Referring to the example of FIG. 1, Internet browser application 104 performs any modifications, not Acme Office Supplies web server 108 or Bob's Office Supplies web server 110.

In some embodiments, a structured data object generated at 308 is generic or agnostic with respect to e-procurement systems. In some embodiments, a structured data object is based upon the particular e-procurement system used (e.g., a plurality of definitions is created for a plurality of e-procurement systems). In this example, a structured data object is generated ahead of time even though it might not be exported to an e-procurement system (e.g., because the user decides she does not want that product). Alternatively, in some embodiments a structured data object is generated after an indication to import/export a structured data object is received from a user.

At 310, it is determined whether to export a structured data object. For example, button 212 of FIG. 2B is clicked by a user using a mouse or other input device. If so, a structured data object is exported to an e-procurement system at 312, perhaps via a browser-initiated post of XML data (e.g. using JavaScript's XmlHttp class, or a script-initiated "form post").

Although the examples above include an e-procurement system and a supplier network, generating a structured data object at a client side (and if desired, exporting it to some destination system or application) is not necessarily limited to such applications. For example, images and/or text may be exported from a website (e.g., a social networking website where members have pages) to an image and/or text editing application.

In some embodiments, one or more scripts are used to generate a structured data object at a client side. In some embodiments, a script is written and/or provided by an entity other than a supplier. A supplier may provide information about where certain pieces of content (e.g., a product name, a price, etc.) are within a website or how such content can be located or identified and one or more scripts uses this information to generate a structured data object for export. This may make it easier for smaller suppliers or other owners of websites to generate a structured data object at a client side. The following figure illustrates an example of such a script.

In other embodiments, "export structured data object" (step 312) only occurs later, if/when the user pushed a button, while the set up piece occurs always, on page initialization. A script runs in the browser and modifies the in-browser content (e.g. HTML DOM) loaded from the supplier web site (modify the in-browser document from supplier to include Add-To-eProcurement button, etc."), generally before it is first rendered by the browser for viewing FIG. 4 is a diagram illustrating an embodiment of a bootstrap script. In the example shown, script 400 is included in the page source for a supplier's website. Line 3 of script 400 includes an Ariba supplier network ID (ASNID) for the example supplier (i.e., ANID50). In some embodiments, each supplier and/or buyer in a supplier network is assigned an alphanumeric value that uniquely identifies it. Line 4 includes a tag or identifier associated with a part number, line 5 includes a tag or identifier associated with a description, and line 6 includes a tag or identifier associated with a price. Line 7 includes a tag or identifier associated with a "add to cart" button. For example, the "add to cart" button may be replaced with an "export to e-procurement system" button.

The tags or identifiers in script 400 are provided or specified by each supplier. For example, one supplier may tag the part number on their website as "PrtNmbr" whereas in this example it is tagged "Part NoSpan." Similarly, each tag or identifier for description, price, and such may vary from supplier to supplier. In this configuration another script (described in further detail below) uses the provided tags or identifiers to generate a structured data object at a client side. For example, if a supplier updates its website to change a price from $40 to $45, the tag remains the same (e.g., "PriceSpan") and price extracted is the new price (e.g., $45). In some embodiments, the supplier may not be required to explicitly identify tags: the script vended by the supplier network could attempt to extract this information heuristically (e.g. looking for text that "looks like" a price or a part number) or by using a supplier-specific extraction map maintained at the supplier network.

Line 9 of script 400 includes a type and a source of a second script to obtain. In this example, the script type is "text/javascript" and the source of the script is "http://supplier.ariba.com/punchout.js." In one example, script 400 is included in page source for Bob's Office Supplies website. Via Internet browser application 104, an employee of First Bank communicates with Bob's Office Supplies web server 110. Page source, including script 400, is returned to Internet browser application 104 via network 102 from web server 110. At Internet browser application 104, script 400 is executed, causing Internet browser application 104 to obtain the punchout script according to line 9 of script 400. In some embodiments, http://supplier.ariba.com is associated with or part of supplier network server 106. In some embodiments, some other server is used. For example, it may be undesirable to send additional traffic to supplier network server 106. In some embodiments, it is desirable to separate services or functionality onto multiple devices so that if one device fails it does not take down other services.

In this example, a punchout script includes instructions to generate a structured data object locally (i.e., on a client side) using the tags or identifiers provided in script 400. This is performed locally, for example at Internet browser 104 rather than at a server, such as supplier network server 106 and/or web server 110 or 112. A punchout script uses the tags or identifiers provided to "scrape off" appropriate content from a supplier's website. For example, in FIG. 2B, if button 212 is pressed, the tag associated with price is used to scrape off, extract, or harvest the price of $50 from website 210.

Figure 5A:
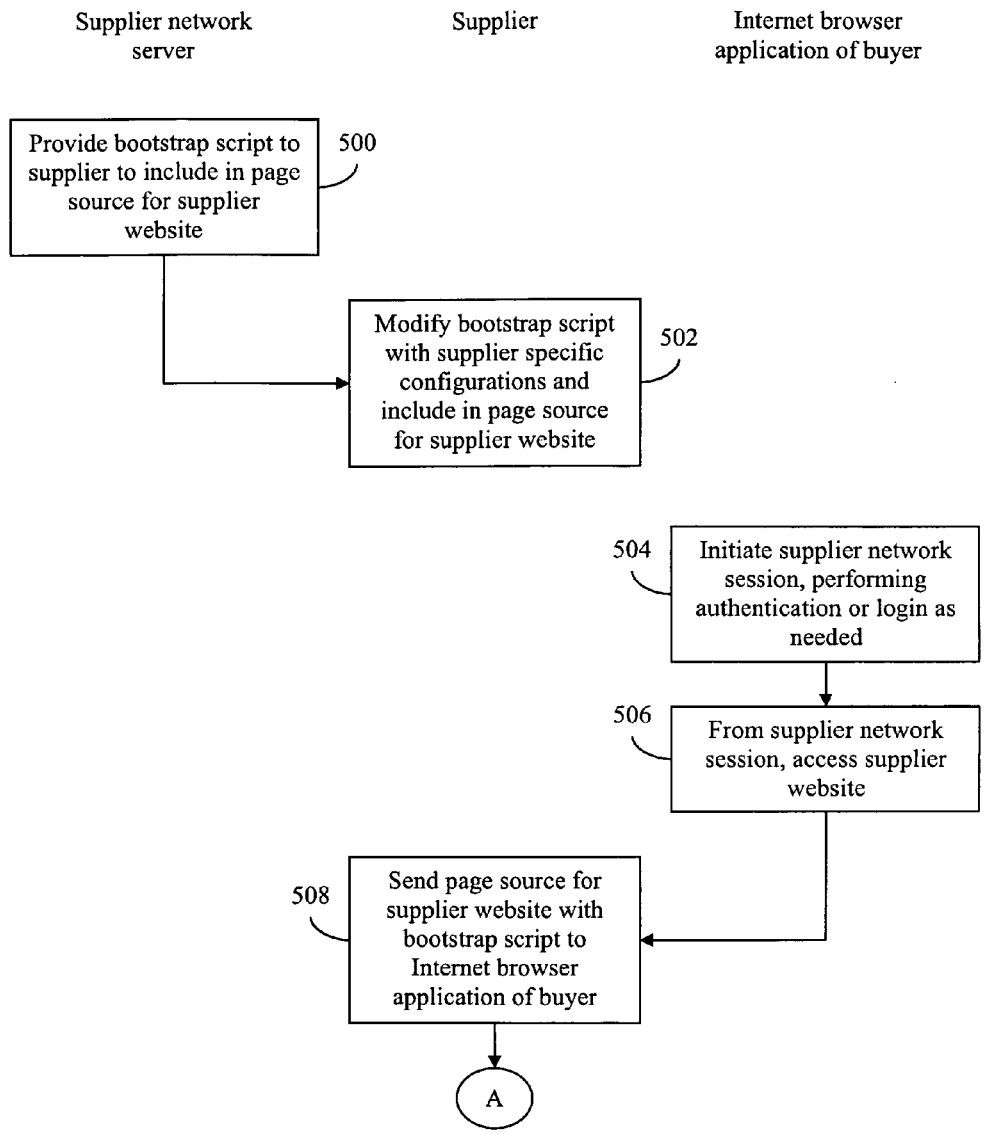
FIG. 5A is a flowchart illustrating an embodiment of a process for generating a structured data object (and if applicable, exporting it) using scripts.

FIG. 5A is a flowchart illustrating an embodiment of a process for generating a structured data object (and if applicable, exporting it) using scripts. In the example shown, the process is performed at a supplier network server (e.g., supplier network server 106), a supplier (e.g., Bob's Office Supplies web server 110), and an Internet browser application (e.g., Internet browser application 104). In the example process, a supplier uses a bootstrap script (e.g., script 400) and a punchout script to implement punchout capabilities for its website. This may be attractive for smaller suppliers that do not want to hire a website developer and/or do not have the technical expertise to implement punchout themselves.

At 500, a bootstrap script is provided to a supplier to include in page source for a supplier website. In this example, a bootstrap script is provided by a supplier network and step 500 is performed at a supplier network server. At 502, a bootstrap script is modified with supplier specific tags and is included in page source for a supplier website; step 502 is performed at a supplier. A tag is used to identify content on a supplier website to be included in a structured data object, for example the price of a product displayed on a supplier's website. Each supplier may use a different tag for the same piece of content (e.g., a price) and the particular tag used by a supplier is provided. In some embodiments, a bootstrap script provided at 500 has "fill in the blank" portions so that the provider knows what tags to provide.

At 504, a supplier network session is initiated and authentication or login is performed as needed. From a supplier network session, a supplier website is accessed at 506. Steps 504-506 are performed at a buyer's Internet browser application. In this example, punchout is only enabled or "on" if a user is associated with a supplier network. For example, if the person accessing a supplier's website is a student, the student does not need to make purchases via an e-procurement system and it is not necessary to generate a structured data object. In some embodiments, punchout is enabled or "on" regardless of a user's status or associations. In some scenarios it is acceptable for anyone to export a structured data object that contains content extracted from a website. Some embodiments are described in further detail below.

At 508, page source for a supplier website with a bootstrap script is sent to an Internet browser application of a buyer. Step 508 is performed at a supplier (e.g., a web server provides the page source).

Figure 5B:
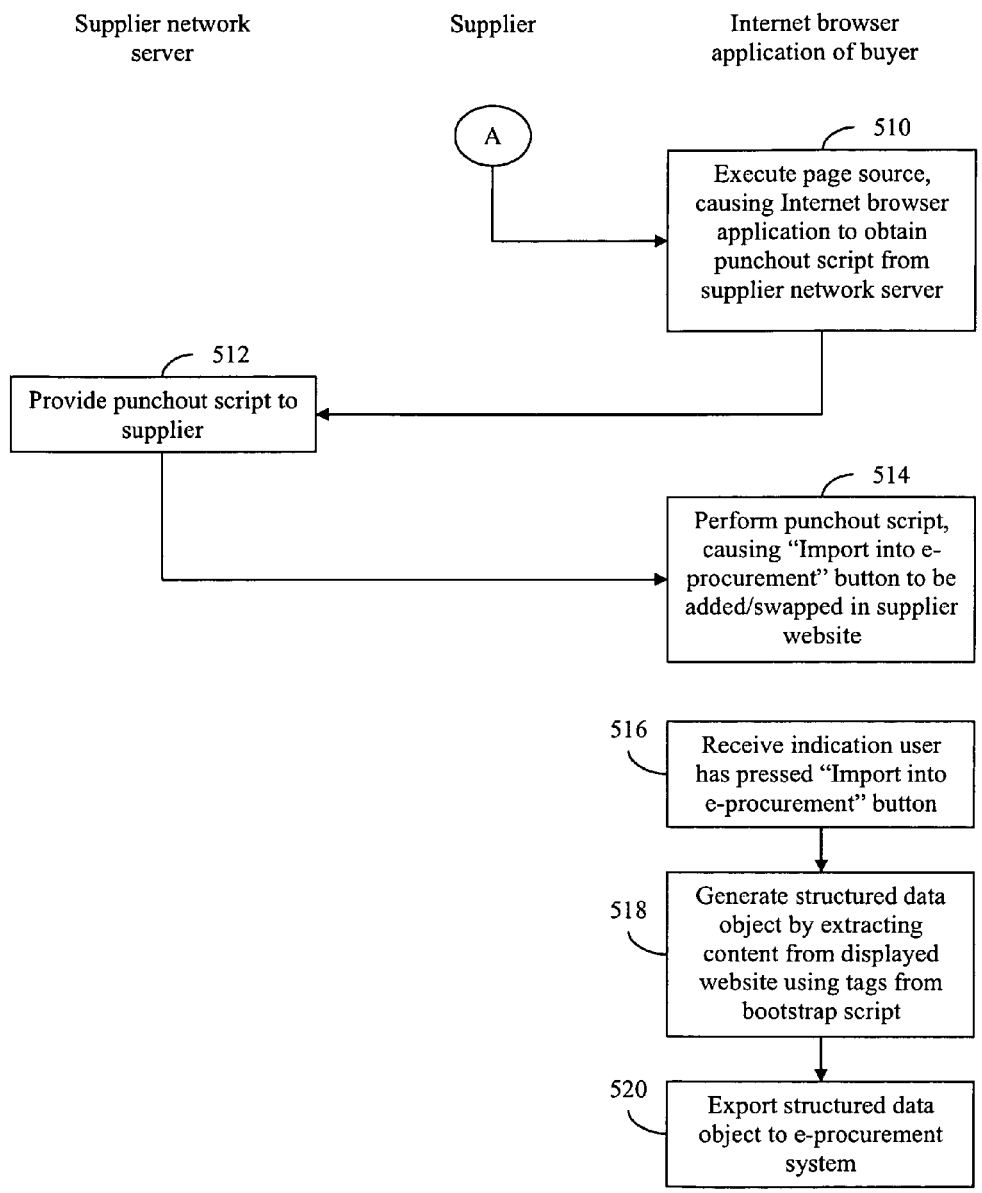
FIG. 5B is a flowchart illustrating a second portion of a process for generating a structured data object using scripts.

FIG. 5B is a flowchart illustrating a second portion of a process for generating a structured data object using scripts. In the example shown, the process of FIG. 5A is continued in this figure. At 510, page source is executed, causing an Internet browser application to obtain a punchout script from a supplier network server. In some embodiments, a punchout script is obtained from some other source or node besides a supplier network server. At 512, a punchout script is provided to a supplier. Steps 510 and 512 are performed respectively at a buyer's Internet browser application and a supplier network server.

At 514, a punchout script is performed, causing an "import into e-procurement" button to be added/swapped in a supplier website. In some embodiments, if an "import into e-procurement button" is swapped with an existing button in a supplier website (e.g., "add to shopping cart" button), a supplier specifies the tag associated with the existing button in a bootstrap script with other tags. In some embodiments, a bootstrap script is used to convey/indicate whether or not there is an existing button to be swapped out. Step 514 in this example is performed at a buyer's Internet browser application. For example, a button is swapped out or added and then the website with the replaced/added button is displayed to the user.

An indication that a user has pressed an "import into e-procurement" button is received at 516. In some cases, this does not occur, for example because the user decides she does not want that particular product and does not push the button. At 518, a structured data object is generated by extracting content from a displayed website using tags from a bootstrap script. For example, if a user presses button 212 of FIG. 2B, a structured data object is generated by scraping off the product name (i.e., Value Brand Black Toner Cartridge), the part number (i.e., VB100), price (i.e., $50), and/or supplier item number (i.e., 5782). In some embodiments, a structured data object generated at 518 includes a supplier network ID (e.g., line 3 of script 400). At 520, a structured data object is exported to an e-procurement system. Steps 516-520 are performed at a buyer's Internet browser application.

Although the above figures show business to business applications, the techniques disclosed herein are not necessarily limited to those applications. The following figures show some embodiments in other applications.

Figure 6:
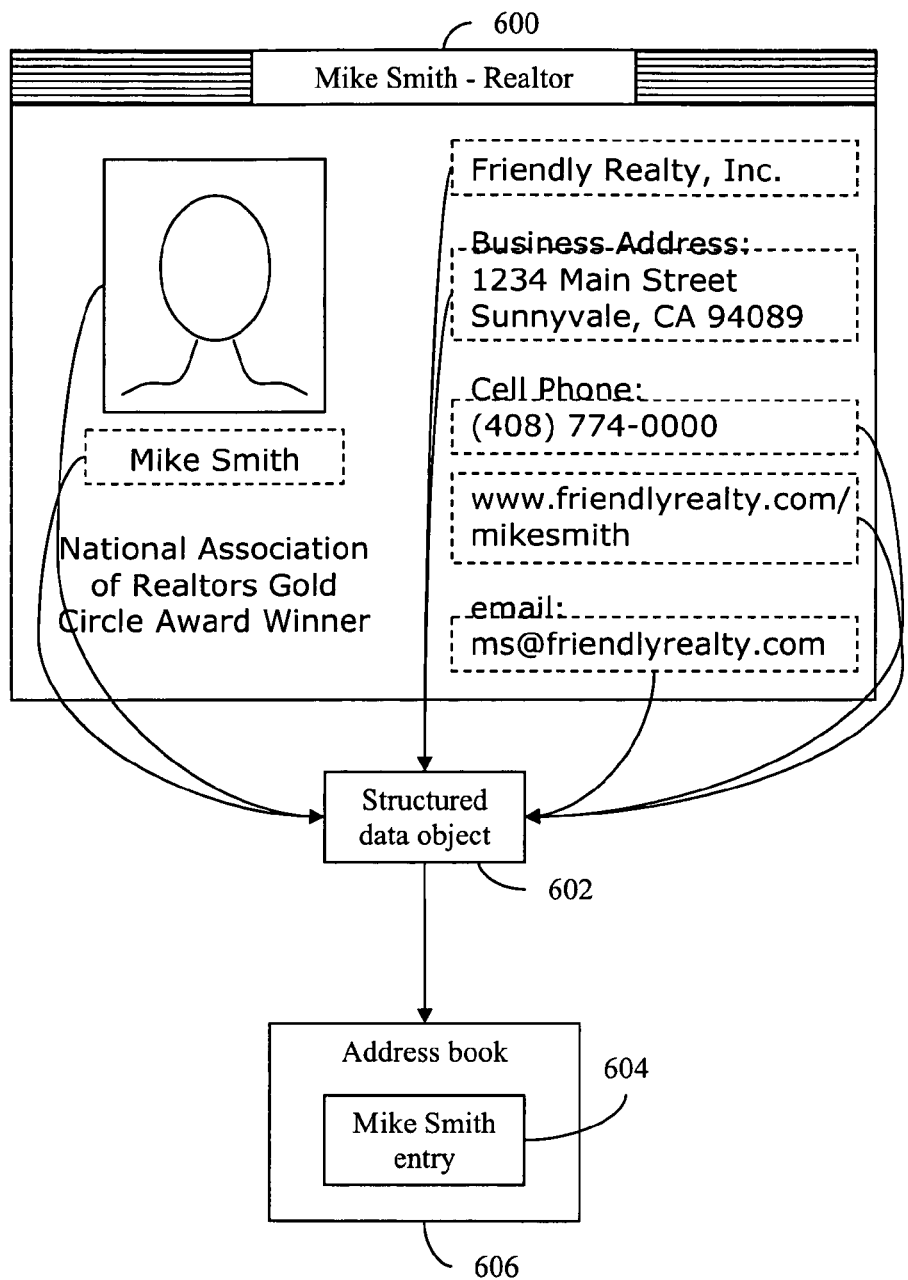
FIG. 6 is a diagram illustrating an embodiment of a realtor's website.

FIG. 6 is a diagram illustrating an embodiment of a realtor's website. In the example shown, website 600 includes contact information for Mike Smith, a realtor. On the left side of website 600 from top to bottom is Mike Smith's head shot, his name, and an award he won (i.e., National Association of Realtors Gold Circle Award Winner). On the right side of website 600 from top to bottom is the name of the real estate company Mike Smith works for (i.e., Friendly Realty, Inc.), a business address (i.e., 1234 Main Street Sunnyvale, Calif. 94089), his cellular phone number (i.e., (408) 774-0000), the URL of his website (i.e., www.friendlyrealty.com/mikesmith), and his email address (i.e., ms@friendlyrealty.com).

Structured data object 602 is generated using content extracted from website 600 at a client side. For example, a potential customer of Mike Smith's may be viewing website 600 using an Internet browser application and structured data object 602 is generated by the potential customer's Internet browser application (e.g., as opposed to a web server associated with website 600). In this example, the dashed boxes indicate the pieces of content that are scraped from the displayed website 600 and used to generate structured data object; a user would not necessarily see the dashed boxes. As shown in this example, content that is extracted from a website and included in a structured data object is not necessarily limited to text or alphanumeric values. In this example, a head shot, which is an image, is included in structured data object 602. Structured data object 602 is imported into address book 606 as entry 604. Once imported into address book 606, entry 604 can be accessed and/or manipulated using the features or interfaces of address book 606. For example, address book 606 may be associated with or part of an email application and a user may create an email to be sent to Mike Smith using the email address in entry 604.

In some embodiments, there is some merge feature or capability if entry 604 already exists in address book 606. For example, Mike Smith may have previously been with another realty company and there is already an entry for him in address book 606. In some embodiments, address book 606 automatically overwrites out of date information in an existing entry for Mike Smith with new information (e.g., replacing a previous address with a new address). In some embodiments, an existing entry is augmented or supplemented with new information without overwriting older information (e.g., an old email address and a new email address are in an entry). In some embodiments, address book 606 asks a user for instructions if it believes there is already an entry for a particular person. Techniques for handling newer and older information that correspond to the same object or entity are not necessarily limited to address book applications and in some embodiments are associated with other applications.

In some embodiments, one or more scripts (e.g., a bootstrap script and/or a punchout script) is/are used to generate structured data object 602 and/or export structured data object 602 to address book 606. In some embodiments, a bootstrap script and/or other scripts are provided by or are part of an application for designing or creating websites.

In various embodiments, a structured data object has a variety of formats or structures. In some embodiments, structured data object 602 is an XML object. In some embodiments, structured data object 602 is in a format associated with or native to an application or system into which it is to be imported. For example, structured data object 602 may be in a format such that it can be imported into address book 606 without translation or modification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating a structured data object, comprising:
   providing, from a supplier network server, one or more scripts to an Internet browser application associated with a buyer, wherein the one or more scripts include a punchout script that is configured to:
      extract a plurality of pieces of content from a website associated with a supplier, wherein the website is accessed using the Internet browser application;
      use a processor to assemble a structured data object which describes a purchase between the buyer and the supplier using the plurality of pieces of content extracted from the website; and
      send the structured data object which describes the purchase between the buyer and the supplier to a procurement system of the buyer which is associated with managing purchases; and
   wherein the punchout script is obtained at least in part by:
      obtaining a bootstrap script;
      modifying the bootstrap script with supplier-specific information;
      sending the bootstrap script with the supplier-specific information from the website associated with the supplier to the Internet browser application associated with the buyer; and
      using the bootstrap script with the supplier-specific information to obtain the punchout script from the supplier network server.

2. A method as recited in claim 1, wherein the one or more scripts is/are further configured to provide a plurality of identifiers, wherein the plurality of identifiers correspond to the plurality of pieces of content associated with the website.

3. A method as recited in claim 1, wherein extraction is performed through analysis of page content rather than through pre-specified identifiers.

4. A method as recited in claim 1, wherein a data extraction script is specified through explicit reference in an original web page.

5. A method as recited in claim 1, wherein the buyer and the supplier are members of a supplier network.

6. A method as recited in claim 1, wherein extracting and/or assembling is/are performed in the event an indication to send the structured data object is received.

7. A method as recited in claim 1, wherein sending is performed in the event an indication to send the structured data object is received.

8. A method as recited in claim 1, wherein the plurality of pieces of content includes at least one of: a name of a product, a price for a product, a manufacturer of a product, a part number of a product, a quantity of a product, or a supplier of a product.

9. A method as recited in claim 1, wherein the plurality of pieces of content includes at least one of: a name of a person, an address, a telephone number, a facsimile number, an email address, or a Uniform Resource Locator (URL).

10. A system for generating a structured data object, comprising:
    a processor configured to provide, from a supplier network server, one or more scripts to an Internet browser application associated with a buyer, wherein the one or more scripts include a punchout script that is configured to:
        extract a plurality of pieces of content from a website associated with a supplier, wherein the website is accessed using the Internet browser application;
        assemble a structured data object which describes a purchase between the buyer and the supplier using the plurality of pieces of content extracted from the website; and
        send the structured data object which describes a purchase between the buyer and the supplier to a procurement system of the buyer which is associated with managing purchases; and
    wherein the punchout script is obtained at least in part by:
        obtaining a bootstrap script;
        modifying the bootstrap script with supplier-specific information;
        sending the bootstrap script with the supplier-specific information from the website associated with the supplier to the Internet browser application associated with the buyer; and
        using the bootstrap script with the supplier-specific information to obtain the punchout script from the supplier network server;
    a memory coupled to the processor and configured to provide the processor with instructions.

11. A non-transitory computer program product for generating a structured data object, the computer program product being embodied in a tangible computer readable storage medium and comprising computer instructions for:
    providing, from a supplier network server, one or more scripts to an Internet browser application associated with a buyer, wherein the one or more scripts include a punchout script that is configured to:
        extract a plurality of pieces of content from a website associated with a supplier, wherein the website is accessed using the Internet browser application;
        assemble a structured data object which describes a purchase between the buyer and the supplier using the plurality of pieces of content extracted from the website; and
        send the structured data object which describes the purchase between the buyer and the supplier to a procurement system of the buyer which is associated with managing purchases; and
    wherein the punchout script is obtained at least in part by:
        obtaining a bootstrap script;
        modifying the bootstrap script with supplier-specific information;
        sending the bootstrap-script with the supplier-specific information from the website associated with the supplier to the Internet browser application associated with the buyer; and
        using the bootstrap script with the supplier-specific information to obtain the punchout script from the supplier network server.

* * * * *